United States Patent Office 2,794,342
Patented June 4, 1957

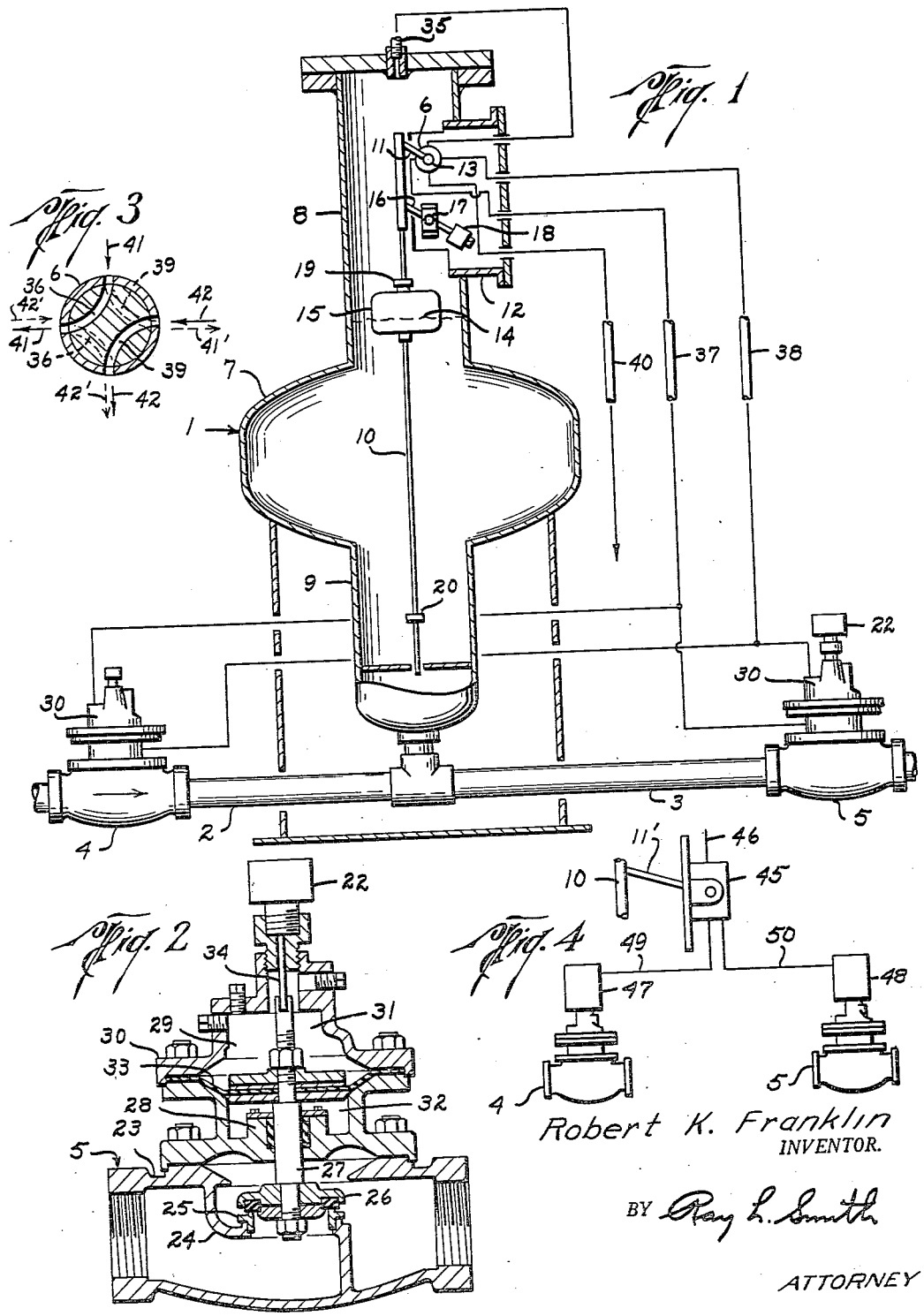

2,794,342

LIQUID METER

Robert K. Franklin, Houston, Tex., assignor to Rolo Manufacturing Company, Houston, Tex., a corporation of Texas Application May 3, 1954, Serial No. 427,292

2 Claims. (Cl. 73—224)

This invention relates to a liquid meter for measuring liquids generally, but which is of particular utility for measuring liquids collected by a field separator which functions to separate oil, gas and water produced simultaneously by oil wells.

An object of the invention is to provide a liquid meter which is simple and of rugged construction, capable of accurate and dependable operation and which will function over a long period of time without attention or maintenance.

Another object is to provide a liquid meter which is fully automatic in its operation.

Still another object is to provide a meter of the class described which is capable of isolating successive and accurately predetermined increments of liquid and recording the number of such increments whereby the total amount of liquid isolated is determined.

It is also an object to provide a float actuated instrument which is so constructed that a small incremental change in liquid at the point of cut-off of admission of liquid to the device and the point of cut-off of exhaust of liquid from the instrument will effect the cyclic operations of the instrument.

A further object is to provide a liquid meter in which the admission of liquid to the interior of the meter chamber and the exhaust of liquid therefrom is had through a single passage through the wall of the chamber.

The foregoing objects, together with other objects and advantages of the invention will be more fully apparent from the following description taken in connection with the accompanying drawings in which:

Fig. 1 is a side elevational view, partly in section, of an embodiment of the invention;

Fig. 2 is an enlarged sectional view through one of the valves for controlling the admission of liquid to, and the exhaust of liquid from, the metering chamber;

Fig. 3 is a diagrammatic view showing the directions of flow of pressure fluid through the control pilot, or pilot valve, during a cycle of operation of the meter;

Fig. 4 is a wiring diagram showing the manner of utilizing electrical energy for actuation of the valves at the inlet and the outlet of the metering chamber.

The invention comprehends a metering chamber 1, the interior of which communicates through a single opening at the bottom of the chamber with an inlet pipe 2 and an outlet pipe 3. The inlet valve 4, when open, admits liquid to be measured to flow through the inlet pipe 2 to the interior of the chamber 1. At the same time the outlet valve 5 in the pipe 3 is closed. When a predetermined amount of liquid has been admitted to the metering chamber 1 control means shown as a pilot valve 6 is actuated and in turn functions to close the inlet valve 4 and to open the outlet valve 5 so that the accumulated and predetermined amount of liquid in the chamber 1 is discharged by way of the pipe 3 and the outlet valve. It should be noted that any gas or air pressure accumulated, or supplied, in the chamber above the liquid will facilitate the discharge of the liquid from the chamber.

The housing forming the metering chamber 1 is of especial construction in that it has a central enlarged portion 7 and vertically aligned upwardly extending portion 8 and downwardly extending portion 9. The inlet and discharge pipes 2 and 3 are connected to the portion 9 at its lower end.

A rod 10 extends vertically within the metering chamber 1, including the extensions 8 and 9 thereof, and has its upper end pivotally attached to the end of the actuating arm 11 on the pilot valve 6 which is mounted within a sideward extension 12 on the portion 8 of the chamber 1. While the pilot valve is shown mounted within the metering chamber, it is quite obvious that such mechanism may be located exteriorly of the chamber and the valve actuating shaft 13 extend outwardly through the wall of the chamber. Or, electrical means may be used to actuate the valves 4 and 5 as illustrated in Fig. 4 and to which further attention will be directed.

Suitable means is provided to counterbalance the rod 10 so that little effort is required to move the rod and the arm 11 to effect desired operation of the meter. Such means is illustrated as an arm 16 mounted upon a pivot 17 within the sideward extension 12 on the metering chamber. One end of this arm is pivotally attached to the rod 10 and the other end carries a weight 18 of such size and location upon the arm 16 as to produce desired counterbalancing action.

A float 15, slidable upon the rod 10, moves upwardly as liquid rises within the chamber 1. As the float rises within the extension 8 of the chamber it engages an upper collar 19 fixed upon the rod 10 and thereafter further rise of the float lifts the rod and the associated arm 11 and hence actuates the pilot valve 6 to effect emptying of the chamber 1. As the float 15 falls with the surface of the liquid discharging from the metering chamber it enters the downward extension 9 and engages the lower collar 20 fixed on the rod 10 and thereby pulls the rod downwardly to return the valve 6 to its original position and hence to restore the device to the liquid receiving portion of its cycle.

Valves 4 and 5 are of conventional construction and may be identical. As shown, valve 5 differs from valve 4 only by the inclusion of a counter 22 which serves to indicate the number of cycles of operation of the meter, and hence to show the amount of liquid metered by the device. A brief description of one of the valves will suffice for both.

As shown in Fig. 2 the valve body 23 has a transverse diagonal wall 24 provided with a valve seat 25 engageable by the valve 26 whereby the passage through may be opened or closed. The valve stem 27 to which the valve 26 is attached passes outwardly through the stuffing box 28 to the interior of the chamber 29 within the valve bonnet 30. This chamber is divided into upper and lower portions 31 and 32 by a diaphragm 33 to which the valve stem 27 is attached. Pressure connections communicate with the portions 31 and 32 of the valve chamber 26 as is shown in Fig. 1 so that pressure applied below the diaphragm 33 will lift the valve from its seat 25 and open the valve, and pressure applied above the diaphragm 33 will lower the valve stem 27 and its associated valve 26 and close the valve.

The counter 22, of conventional construction, is mounted upon the upper end of the bonnet 30 and has its actuator rod 34 attached to the upper end of the valve stem 27. The actuator rod is thus positively moved by the reciprocation of the valve stem 27 during each cycle of movement of the valve stem.

When the diaphragm type of valve is used as contemplated by the device shown in Figs. 1, 2 and 3 a source of pressure fluid is required. If the device is used for measuring fluids produced by an oil well there is usually entrained gas which may be used for this purpose. Hence, the embodiment shown includes a pressure connection 35 at the upper end of the chamber. It is to be understood that any other source of gaseous or liquid pressure fluid may be used to supply necessary pressure to actuate the valves 4 and 5, and also that, in event gas or air is not present with the liquid to be measured, gaseous fluid pressure may be supplied above the liquid in the chamber to facilitate discharge of the measured liquid from the chamber.

When the meter is filled with liquid to the level indicated by the line 14 the parts of the mechanism are in the relative positions shown in Fig. 1. At this instant the valving element of the four-way pilot valve 6 has moved to the position shown in Fig. 3 and the flow of fluid will be in the directions indicated by the arrows 41 and 42. Gas supplied by the line 35 will flow by way of passage 36 in the valve 6 to the conduit 37 whereby such pressure is applied above the diaphragm 33 in the valve 4 to close this valve, and below the diaphragm 33 in the valve 5 so that the latter will open and permit the discharge of liquid from the chamber 1.

During the operation of the valves 4 and 5 as just described, the chamber below the diaphragm in the valve 4 and the chamber above the diaphragm in the valve 5 is opened to atmosphere by way of conduit 38, passage 39 in the valve 6, and the conduit 40, which is open to atmosphere. It seems apparent therefore that during this portion of the cycle of operations the flow of pressure fluid is in the directions indicated by the arrows 41 and 42 in Fig. 3 and that such pressure fluid is instrumental at this portion of the cycle in closing valve 4, opening the valve 5 and at the same time applying pressure to the surface of the liquid in the chamber 1 to accelerate its discharge from the chamber.

An important feature of the invention resides in the fact that the portions 8 and 9 of the chamber 1 are of relatively small cross section as compared with the cross section of the central portion 7 of the chamber. For this reason the surface of the liquid rising or falling in either of these portions changes rapidly from a relatively small change in the volume of liquid within the chamber. Thus during the discharge of liquid from the chamber and as the float 15 enters the lower extension 9, a small change in the volume of liquid remaining in the chamber causes the float to engage the collar 20 on the rod 10. The rod then moves downwardly with the float thus actuating the valve 6 so that the passages 36 and 39 therethrough are moved to the dotted positions shown in Fig. 3. Pressure fluid is then directed, as indicated by the arrow 41, through passage 39 to conduit 38 which directs the fluid to the chamber above the diaphragm in valve 5 and to the chamber below the diaphragm in valve 4 whereby the former is closed and the latter is opened. Fluid that would otherwise be trapped in the chambers below and above these diaphragms, respectively, is exhausted through conduit 37 and thence, as indicated by the arrow 42', through passage 36 to the conduit 40 which as already explained is open to the atmosphere.

The operation of the disclosed embodiment of Figs. 1, 2 and 3 is believed apparent from the foregoing description. By way of supplementation it will be assumed that valve 4 is open and valve 5 is closed at the beginning of the filling operation, the float 10 being at its lowermost position. Liquid to be measured enters the chamber 1 the float 15 rising with the surface of the liquid. While the enlarged portion 7 of the chamber 1 is filling the rate of rise is relatively small but as the liquid enters the upward extendsion 8 a small change in the volume of the liquid admitted to the chamber will cause a relatively large rise of the float 15 which engages the collar 19 and thereafter rapidly lifts the rod 10 to acuate the valve 6 when a predetermined amount of liquid has entered the chamber and the surface of the liquid has reached the level shown at 14.

Actuation of the valve 6 effects closure of the valve 4 and opening of the valve 5 whereby the flow of liquid to the metering chamber is cut off and the accumulated liquid is drained off to a suitable pipe line or container. As the liquid level falls and enters the downward extension 9 a small change in the volume discharged from the chamber will cause a relatively large descent of the float 15 which will engage the collar 20 and will move the rod downwardly to again actuate the valve 6 to effect closure of the valve 5 and thus to cut off discharge from the chamber, and to open the valve 4 and initiate the succeeding cycle. In the meantime the counter 22 will have been operated by the actuation of valve 5 to indicate the quantity of liquid measured by the device.

In Fig. 4 there is shown a schematic electric circuit for actuating valves 4 and 5 electrically to obtain operation in a manner identical to that just described. The rod 10 in this alternate structure is attached to the lever 11' of a switch 45 to which power is applied by way of conductors 46. The diaphragm structure of valves 4 and 5 is replaced by solenoids 47 and 48 so that the switch 45 will alternately energize and deenergize these solenoids through conductors 49 and 50 to effect opening and closing of the valves 4 and 5 in the sequence above explained.

Broadly the invention comprehends a new and improved liquid meter, such meter having its component parts so constructed and arranged as to provide a high degree of accuracy in measurement of liquid and at the same time capable of maintaining such accuracy over a long period of time and of rigorous use.

The invention claimed is:

1. A liquid metering apparatus comprising a closed liquid metering chamber having a main central portion and aligned upper and lower elongate portions of reduced cross-section, a single vertical liquid passageway opening into the lower extremity of the lower elongate portion of said metering chamber for both the entrance and the exit of liquid into and from said metering chamber, pressure fluid actuated inlet and outlet valves connected to said passageway, there being a pressure fluid within the metering chamber to exert pressure against the surface of liquid therein, pressure fluid conductor means connected to the upper portion of said chamber and to said inlet and outlet valves, a pilot valve interposed in said conductor means, said pilot valve being operative in a first position to direct the pressure fluid simultaneously to said inlet and outlet valves to open and close said valves respectively, and operable in a second position to direct the pressure fluid simultaneously to said inlet and outlet valves to close and open said valves respectively, registering means operative in response to the completion of an opening and closing cycle of at least one of said valves to record the number of complete opening and closing cycles thereof, a control lever selectively operable to move said pilot valve into said first and second positions, a vertically movable guide rod extending beyond the upper and lower levels of the central portion of said metering chamber and into said elongate portions of reduced cross-section, said control lever being pivotally secured to said guide rod, a float slidably mounted on said guide rod for vertical movement therealong in response to a change in liquid level in said metering chamber, a top collar secured on the upper portion of said guide rod and engageable by the float at a point in the upward movement thereof, whereby said guide rod is raised therewith to pivot said control lever and move said pilot valve into its second position, a bottom collar secured to the lower portion of said guide rod for engagement by the float at a point in the downward movement thereof to effect downward movement of said guide rod, whereby said control lever is pivoted in the opposite direction to move said pilot valve into its first position.

2. A liquid metering apparatus comprising a closed liquid metering chamber having a main central portion and aligned upper and lower elongate portions of reduced cross-section, a single vertical liquid passageway opening into the lower extremity of the lower elongate portion of said metering chamber for both the entrance and the exit of liquid into and from said metering chamber, pressure fluid actuated inlet and outlet valves connected to said passageway, conduit means and a pilot valve therein operative in a first position to direct pressure fluid to open and close said inlet and outlet valves respectively and operable in a second position to close and open said inlet and outlet valves respectively, registering means operatively connected to at least one of said valves for recording the number of complete opening and closing cycles thereof, a vertical guide rod mounted for limited longitudinal movement within said chamber, said guide rod extending into said upper and lower elongate portions, means connecting said guide rod with said pilot valve for moving said pilot valve into said first position upon upward movement of said rod and into said second position upon downward movement thereof, a float slidably mounted on said guide rod for vertical movement therealong in response to a change in liquid level in said metering chamber, upper stop means on said guide rod engageable by said float to move said guide rod upwardly when said float rises to a predetermined upper level, lower stop means on said guide rod engageable by said float to move said guide rod downwardly when said float falls to a predetermined lower level, there being a pressure fluid within the metering chamber to exert pressure against the surface of the liquid therein, and means to conduct said pressure fluid to said pilot valve.

References Cited in the file of this patent

UNITED STATES PATENTS

| | | |
|---|---|---|
| 679,814 | Wright | Aug. 6, 1901 |
| 936,358 | Rak | Oct. 12, 1909 |
| 1,114,360 | Hornung | Oct. 20, 1914 |
| 1,386,301 | Adair et al. | Aug. 2, 1921 |
| 1,455,211 | Kelly | May 15, 1923 |
| 1,529,218 | Sandwell | Mar. 10, 1925 |
| 1,871,044 | Crosthwait et al. | Aug. 9, 1932 |
| 1,876,958 | Kelly | Sept. 13, 1932 |
| 1,934,291 | Baas | Nov. 7, 1933 |
| 2,582,387 | Macneish | Jan. 15, 1952 |
| 2,633,750 | Langstaff | Apr. 7, 1953 |
| 2,649,713 | Dunavent | Aug. 25, 1953 |